United States Patent
Ro et al.

(10) Patent No.: US 9,467,532 B2
(45) Date of Patent: Oct. 11, 2016

(54) SERVER, ARITHMATIC PROCESSING METHOD, AND ARITHMATIC PROCESSING SYSTEM

(71) Applicant: Industry-Academic Cooperation Foundation, Yonsei University, Seoul (KR)

(72) Inventors: Won Woo Ro, Seoul (KR); Keunsoo Kim, Seoul (KR); Seung Hun Kim, Incheon (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 520 days.

(21) Appl. No.: 13/746,365

(22) Filed: Jan. 22, 2013

(65) Prior Publication Data

US 2013/0191446 A1    Jul. 25, 2013

(30) Foreign Application Priority Data

Jan. 20, 2012    (KR) ........................ 10-2012-0006708

(51) Int. Cl.
*H04L 29/06* (2006.01)
*G06F 9/50* (2006.01)

(52) U.S. Cl.
CPC ............. *H04L 67/42* (2013.01); *G06F 9/5044* (2013.01); *G06F 2209/509* (2013.01); *G06F 2209/549* (2013.01)

(58) Field of Classification Search
CPC ........ G06F 9/5027; G06F 8/314; G06F 1/26; G06F 12/1081; G06F 1/3243; G06F 1/3296; G06F 2209/5017; G06F 8/52; G06F 9/3851; G06F 9/3877; G06F 9/4881; G06F 9/5072; G06F 9/54; G06F 9/546; G06F 1/206; G06F 1/3287; G06F 2209/5013; G06F 2209/509; G06F 2209/541; G06F 9/3017; G06F 9/3887; G06F 9/45533; G06F 9/5044; G06F 9/544; G06F 11/3624; G06F 11/3636; G06F 12/10; G06F 12/1027; G06F 13/102; G06F 13/14; G06F 13/28; G06F 13/38; G06F 13/385; G06F 13/4068; G06F 15/17; G06F 17/30445; G06F 19/22; G06F 21/56; G06F 2209/5021; G06F 2209/549; G06F 2212/302; G06F 2213/0058; G06F 1/20; G06F 9/5083; G06F 9/5094; G06F 11/0709; G06F 8/453; G06F 11/3404; H04L 1/0003; H04L 1/0009; H04L 25/03343; H04L 25/03891; H04L 29/06081; H04L 41/50; H04L 5/0007; H04L 63/20; H04L 67/1097; H04L 67/42; H04L 69/12

See application file for complete search history.

(56) References Cited

U.S. PATENT DOCUMENTS 8,225,300 B1 * 7/2012 Webb ..................... G06F 9/5027
                                                     717/149
8,266,232 B2    9/2012 Piper et al.
(Continued)

FOREIGN PATENT DOCUMENTS

KR         10-0172468 B1    3/1999
KR    10-2000-0050244 A     8/2000
(Continued)

OTHER PUBLICATIONS

Simecek et al (Non-Patent Literature Titled "GPU Cluster for Acceleration of Computations", ICPM '11 International Conference of Mathematics, Oct. 20-21, 2011, Liberec, Czech Republic).*
(Continued)

*Primary Examiner* — Kevin Bates
*Assistant Examiner* — Ranjan Pant
(74) *Attorney, Agent, or Firm* — Carter, DeLuca, Farrell & Schmidt, LLP

(57) ABSTRACT

A computing method is provided which includes calling a general purpose graphics processing subroutine for execution of a target program by a client; sending a program code and resource data for execution of the target program to a server by the client; and executing the program code using a general purpose graphics processing unit by the server.

7 Claims, 5 Drawing Sheets

(56) References Cited

U.S. PATENT DOCUMENTS

| | | | |
|---|---|---|---|
| 2007/0124363 A1* | 5/2007 | Lurie | G06F 9/5072 709/202 |
| 2011/0035737 A1* | 2/2011 | Stefansson | G06F 9/5072 717/149 |
| 2011/0057937 A1* | 3/2011 | Wu | G06F 15/8023 345/505 |
| 2011/0252411 A1* | 10/2011 | Martin | G06F 8/456 717/149 |
| 2012/0239592 A1* | 9/2012 | Esbensen | G06Q 10/067 705/36 R |
| 2014/0063027 A1* | 3/2014 | Becker | G06F 13/14 345/520 |

FOREIGN PATENT DOCUMENTS

| | | |
|---|---|---|
| KR | 10-1079011 A | 12/2004 |
| KR | 10-2011-0010608 A | 2/2011 |
| KR | 10-2011-0037051 A | 4/2011 |
| KR | 10-2011-0106870 A | 9/2011 |

OTHER PUBLICATIONS

Title: GPU Cluster for Acceleration of Computations, Authors: Ivan Simecek and Filip Simek, Publisher:ICPM '11 International Conference Presentation on Mathematics Oct. 20-21, 2011, Liberec, Czech Republic. 6 pages.*

* cited by examiner

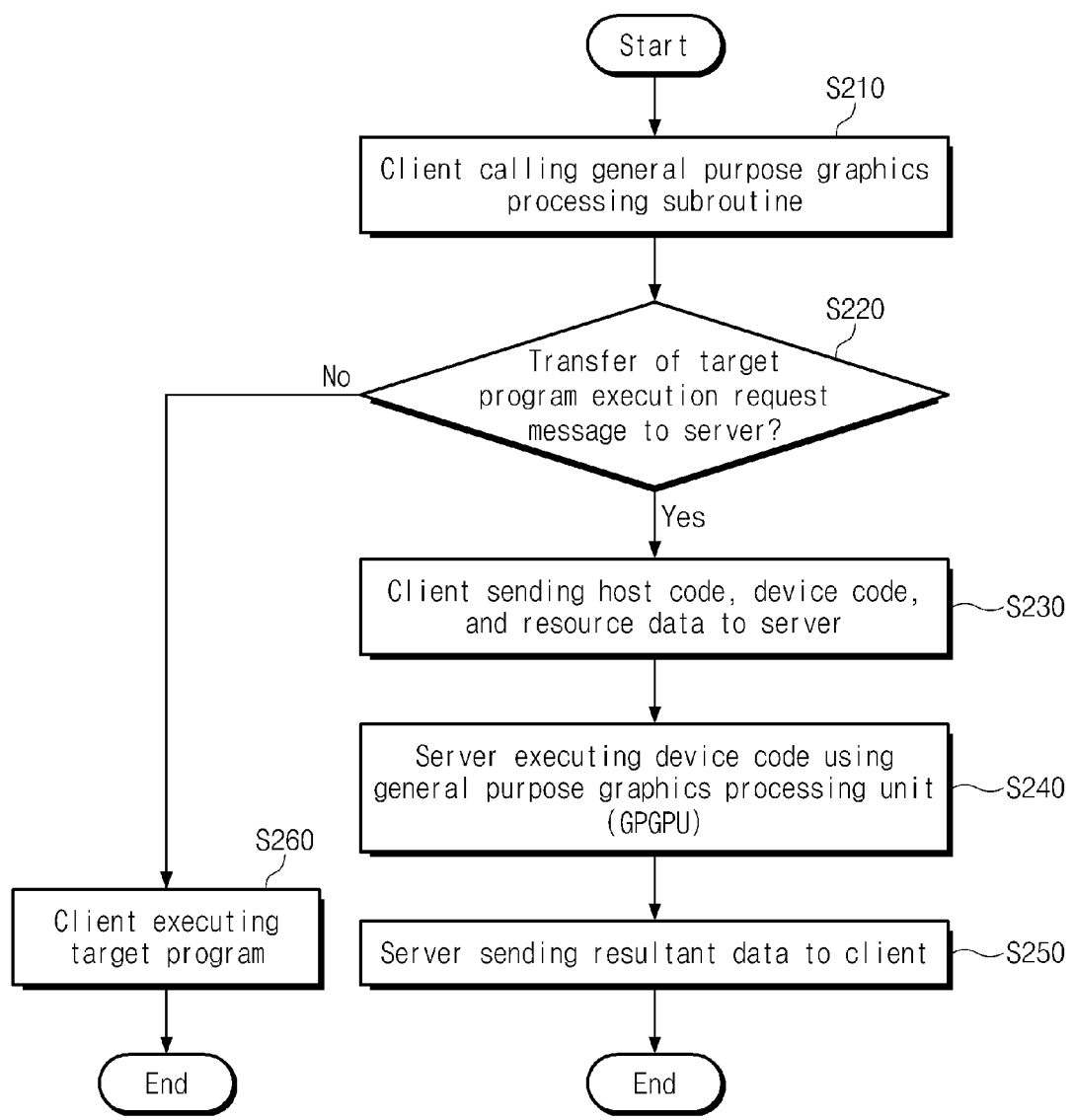

# SERVER, ARITHMATIC PROCESSING METHOD, AND ARITHMATIC PROCESSING SYSTEM

CROSS-REFERENCE TO RELATED APPLICATIONS

A claim for priority under 35 U.S.C. §119 is made to Korean Patent Application No. 10-2012-0006708 filed Jan. 20, 2012, in the Korean Intellectual Property Office, the entire contents of which are hereby incorporated by reference.

BACKGROUND

The inventive concepts described herein relate to a server, a computing method, and a computing system.

A general purpose graphics processing unit (hereinafter, referred to as GPGPU) may be a processor which performs graphics processing as well as general computing. In comparison with a central processing unit (CPU), the GPGPU may have excellent computing capacity via parallel processing.

With high performance of mobile devices, in recent years, the use of a program using the GPGPU may increase in the mobile device. However, due to its limited power, computing speed or the like, running a program using the GPGPU in the mobile device is not. Further, mounting expensive GPGPU in the mobile device makes manufacturing cost increase. Hence, studies have been being made to reduce the burden for the mobile device when executing a program using the GPGPU.

In order to reduce the burden, generally a server is programmed to be suitable for a specific purpose. That is, a server capable of executing a specific computation may be previously programmed and a client (e.g., a mobile device) may call and use the program from server. With such a method, however, only specific computation may be executed via the server, so that efficiency is lowered.

SUMMARY

One aspect of embodiments of the inventive concept is directed to provide a computing method which comprises calling a general purpose graphics processing subroutine for execution of a target program by a client; sending a program code and resource data for execution of the target program to a server by the client; and executing the program code using a general purpose graphics processing unit by the server.

In example embodiments, the computing method further comprises sending resultant data to the client by the server.

In example embodiments, the computing method further comprises determining whether to send a request message for execution of the target program by the client.

In example embodiments, the program code includes a host code and device code.

In example embodiments, the device code is a parallel thread execution (PTX) code.

In example embodiments, the host code is a Java Bytecode.

Another aspect of embodiments of the inventive concept is directed to provide a server which comprises a processing unit which receives a host code, a device code, and resource data for execution of a target program from at least one client and requests execution of the device code; and a general purpose graphics processing unit which executes the device code provided from the processing unit and sends resultant data to the processing unit.

In example embodiments, the processing unit comprises a communication unit which receives the host code, the device code, and the resource data from the at least one client and sends the resultant data to the at least one client; and a code execution unit which executes the host code to request execution of the device code at the general purpose graphics processing unit.

In example embodiments, the processing unit is in plurality.

In example embodiments, the server further comprises a task managing unit which manages requests on execution of the device code transferred from the plurality of processing units to the general purpose graphics processing unit.

In example embodiments, the device code is a parallel thread execution (PTX) code.

In example embodiments, the host code is a Java Bytecode.

Still another aspect of embodiments of the inventive concept is directed to provide a computing system which comprises a client and a server. The client requests execution of a target program at the server. The server receives a request on execution of the target program from the client to execute the target program using a general purpose graphics processing unit and transfers resultant data to the client. The server is provided with a program code and resource data for execution of the target program from the client.

Still another aspect of embodiments of the inventive concept is directed to provide a computing system which comprises a client and a server. The client requests execution on at least one of a plurality of arithmetic operations associated with general purpose graphics processing at the server and directly executes the remaining arithmetic operations of the plurality of arithmetic operations other than the at least one arithmetic operation. The server executes the at least one arithmetic operation requested from the client using a general purpose graphics processing unit and sends resultant data to the client.

BRIEF DESCRIPTION OF THE FIGURES

The above and other objects and features will become apparent from the following description with reference to the following figures, wherein like reference numerals refer to like parts throughout the various figures unless otherwise specified, and wherein

FIGS. 5 and 6 are flow charts illustrating a computing method according to an embodiment of the inventive concept.

DETAILED DESCRIPTION

Figure 1:
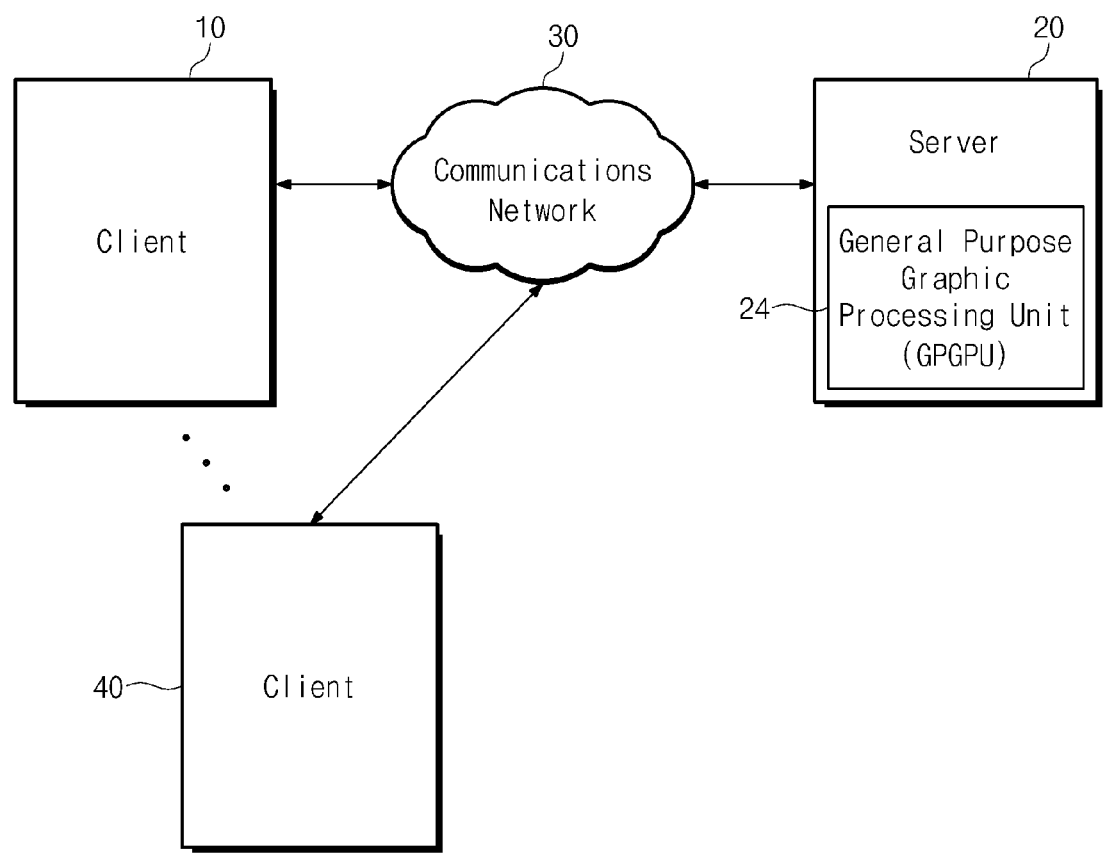
FIG. 1 is a diagram schematically illustrating a computing system according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Terms "unit", "block", "module", and the like may be used to indicate a unit of processing at least one function or operation. For example, such terms unit", "block", and "module" may mean software, or a hardware element such as ASIC or FPGA. However, such terms are not limited to software or hardware. The "unit", "block", and "module" may be configured to be included within an addressable storage medium or to operate one or more processors. Thus, "unit", "block", and "module" may include constituent elements such as software elements, Object-Oriented software elements, class elements, and task elements, processes, functions, attributes, procedures, sub-routines, segments of program code, drivers, firmware, micro code circuit, data, database, data structures, tables, arrays, and variables. Elements and functions provided within the "unit", "block", and "module" may be jointed to reduce the number of elements and the "unit", "block", and "module", or may be additionally divided into elements and "unit", "block", and "module".

An embodiment of the inventive concept may relate to a server, a computing method, and a computing system. Below, a server, a computing method, and a computing system will be more fully described with reference to FIGS. 1 to 6.

In this specification, a client may refer to a component which requests execution of a program using a GPGPU. Also, the server may refer to a component which receives and processes a request on execution of the program using the GPGPU from the client and transmits resultant data according to the execution of the program to the client.

FIG. 1 is a diagram schematically illustrating a computing system according to an embodiment of the inventive concept.

Referring to FIG. 1, a computing system according to an embodiment of the inventive concept may include a client for example a plurality of clients 10 and 40, a server 20, and a communications network 30. In FIG. 1, there is illustrated an example in which the computing system includes one server. However, the inventive concept is not limited thereto. For example, the computing system may include a plurality of servers.

The plurality of clients 10 and 40 may be connected with the server 20 via the communications network 30. The plurality of clients 10 and 40 may be connected with the server 20 simultaneously or sequentially. For example, the plurality of clients 10 and 40 may request execution of a program using a GPGPU at the server 20.

The plurality of clients 10 and 40 may be mobile devices. For example, each of the plurality of clients 10 and 40 may be a cellular phone, a PDA, a PMP, an MP3 player or the like. Also, each of the plurality of clients 10 and 40 may be a notebook computer, a PC, a laptop computer, a netbook computer or the like.

The program using the GPGPU may mean all types of programs designed to be executed at the GPGPU. The program using the GPGPU may not be limited to a program. The program using the GPGPU may be understood to include a variety of computing (e.g., voice, image, and image data processing).

The server 20 may be connected with the plurality of clients 10 and 40 via the communications network 30. The server 20 may execute the program in response to a request on execution of the program using the GPGPU by the client, and may transmit resultant data to the plurality of clients 10 and 40, respectively. The resultant data may include a result value obtained by executing the program.

The communications network 30 may include various communications protocols. The communications network 30 may include a wire or wireless communications protocol. In the case that the communications network 30 includes a wire communications protocol, it may use an Ethernet communications protocol, for example. In the case that the communications network 30 includes a wireless communications protocol, it may use Wi-Fi, Zigbee, Bluetooth, LTE, for example.

Below, the computing system according to an embodiment of the inventive concept will be more fully described with reference to FIG. 2.

Figure 2:
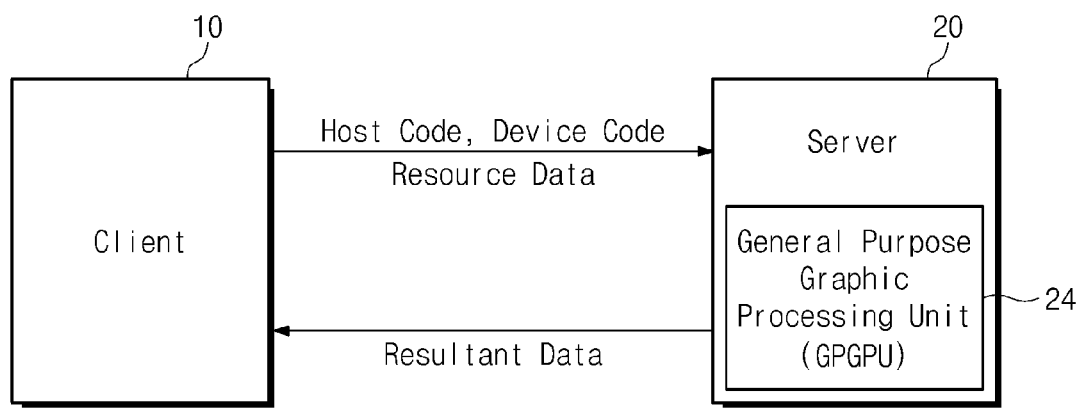
FIG. 2 is a diagram concretely illustrating a computing system according to an embodiment of the inventive concept.

FIG. 2 is a diagram concretely illustrating a computing system according to an embodiment of the inventive concept. To help comprehension, there will be described such a case that one client 10 requests execution of a program using a GPGPU at a server 20.

Referring to FIG. 2, the client 10 may send a program code and resource data for program execution to the server 20. The program code may include a host code and a device code.

The host code may mean a code for starting execution of the device code. The host code may be combined to have a Java Bytecode form. For example, the host code may be designed using the Java.

The device code may mean a code for execution of the program. The device code may be compiled to have a parallel thread execution (PTX) code form. The device code may be designed using CUDA creased by NVIDIA, for example.

The resource data may mean data needed at execution of the program. For example, the resource data may include a reference variable value, a required data file, a subroutine parameter value, and so on.

The server 20 may include a general purpose graphics processing unit (GPGPU) 24. The server 20 may receive the host code, the device code, and the resource code from the client 10 to execute the program. For example, the GPGPU 24 of the server 20 may execute the program to generate resultant data according to execution of the program. The resultant data generated may be sent to the client 10 from the server 20.

Although the client 10 does not include the GPGPU 24, the computing system according to an embodiment of the inventive concept may communicate with the server 20 to execute the program via the server 20 including the GPGPU 24. Thus, it is possible to improve a program processing speed. Also, the whole computing speed of the client 10 may be improved. Also, the burden of the client 10 at execution of the program may be reduced.

In another aspect, in the case that the client 10 performs a plurality of computing operations, the client 10 may internally process a part of the plurality of computing operations, and may request execution of the program at the server 20 with respect to a part of the plurality of arithmetic operations. For example, the client 10 may internally process image data, that is, graphics processing may be internally performed by the client 10. On the other hand, the client 10 may request execution of the program at the server 20 with respect to the remaining computing operations. In this case, the client 10 may process a plurality of computing operations more efficiently.

Figure 3:
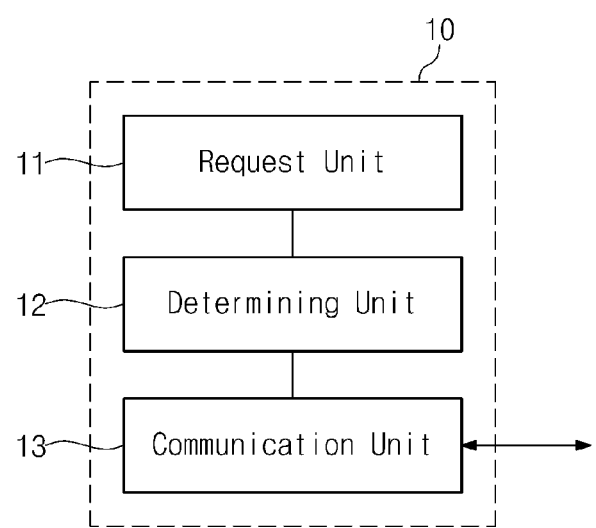
FIG. 3 is a diagram illustrating a client of a computing system according to an embodiment of the inventive concept.

FIG. 3 is a diagram illustrating a client of a computing system according to an embodiment of the inventive concept.

Referring to FIG. 3, a client 10 may include a request unit 11, a determining unit 12, and a communication unit 13.

The request unit 11 may request execution of a program using a GPGPU at a server 20. For example, in the case that execution of the program is required the request unit 11 may call a general purpose graphics processing subroutine. The general purpose graphics processing subroutine may comprise a host code and a device code.

The determining unit 12 may determine whether to send a program execution request message to the server 20. Although not illustrated in FIG. 3, in a case where the client 10 executes the program, that is, if the client 10 includes the GPGPU, the determining unit 12 may not send the program execution request message to the server 20.

The communication unit 13 may send the program execution request message to the server 20. Also, the communication unit 13 may send a host code, a device code, and resource data to the server 20. The communication unit 13 may include a wire or wireless communications protocol. In the case that the communication unit 13 includes a wire communications protocol, it may use an Ethernet communications protocol, for example. In the case that the communication unit 13 includes a wireless communications protocol, it may use Wi-Fi, Zigbee, Bluetooth, LTE, for example.

Figure 4:
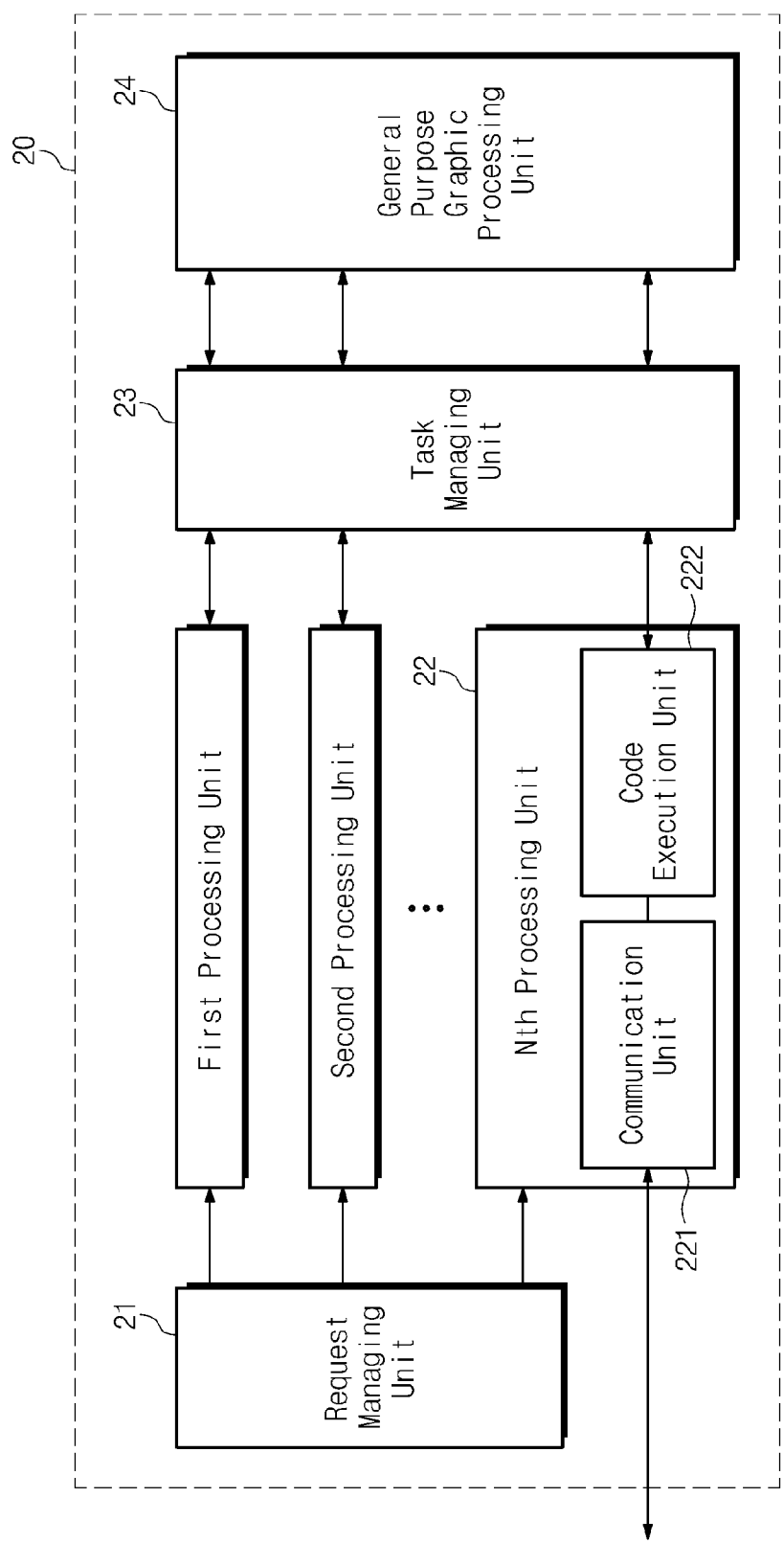
FIG. 4 is a diagram concretely illustrating a server of a computing system according to an embodiment of the inventive concept.

FIG. 4 is a diagram concretely illustrating a server of a computing system according to an embodiment of the inventive concept.

Referring to FIG. 4, a server 20 may include a request managing unit 21, a processing unit 22, a task managing unit 23, and a general purpose graphics processing unit (GPGPU) 24. In FIG. 4, there is illustrated an example in which the server 20 includes one processing unit. However, the inventive concept is not limited thereto. For example, the server 20 may include a plurality of processing units.

The request managing unit 21 may receive a program execution request message from a client 10. The request managing unit 21 may transfer the program execution request message to the processing unit 22. The request managing unit 21 may deny the program execution request message when a plurality of processing units 22 is in operation.

The processing unit 22 may receive the request message from the request managing unit 21. The processing unit 22 may receive a host code, a device code, and resource data from a communication unit 13 of the client 10 corresponding to the request message, and may request execution of the device code at the task managing unit 23.

The processing unit 22 may include a communication unit 221 and a code execution unit 222. The communication unit 221 may receive the host code, the device code, and the resource data from the communication unit 13 of the client 10. The code execution unit 222 may execute the host code. The host code may mean a code for starting execution of the device code. Thus, the code execution unit 222 may execute the host code to request execution of the device code at the task managing unit 23.

The task managing unit 23 may send the device code to the GPGPU 24. The GPGPU 24 may execute the device code to generate resultant data.

If execution of the device code is requested from the plurality of processing units 22, the task managing unit 23 may manage requests on execution of the device code. For example, the task managing unit 23 may enable the GPGPU 24 to execute the requests on execution of the device code sequentially.

The GPGPU 24 may execute the device code transferred from the task managing unit 23. This may mean that the GPGPU 24 executes the program. The GPGPU 24 may provide the task managing unit 23 with resultant data according to execution of the device code. If resource data is required during execution of the device code, the GPGPU 24 may request the resource data via the task managing unit 23. In this case, the task managing unit 23 may be provided with the resource data from the processing unit 22 to send the resource data to the GPGPU 24.

Figure 5:
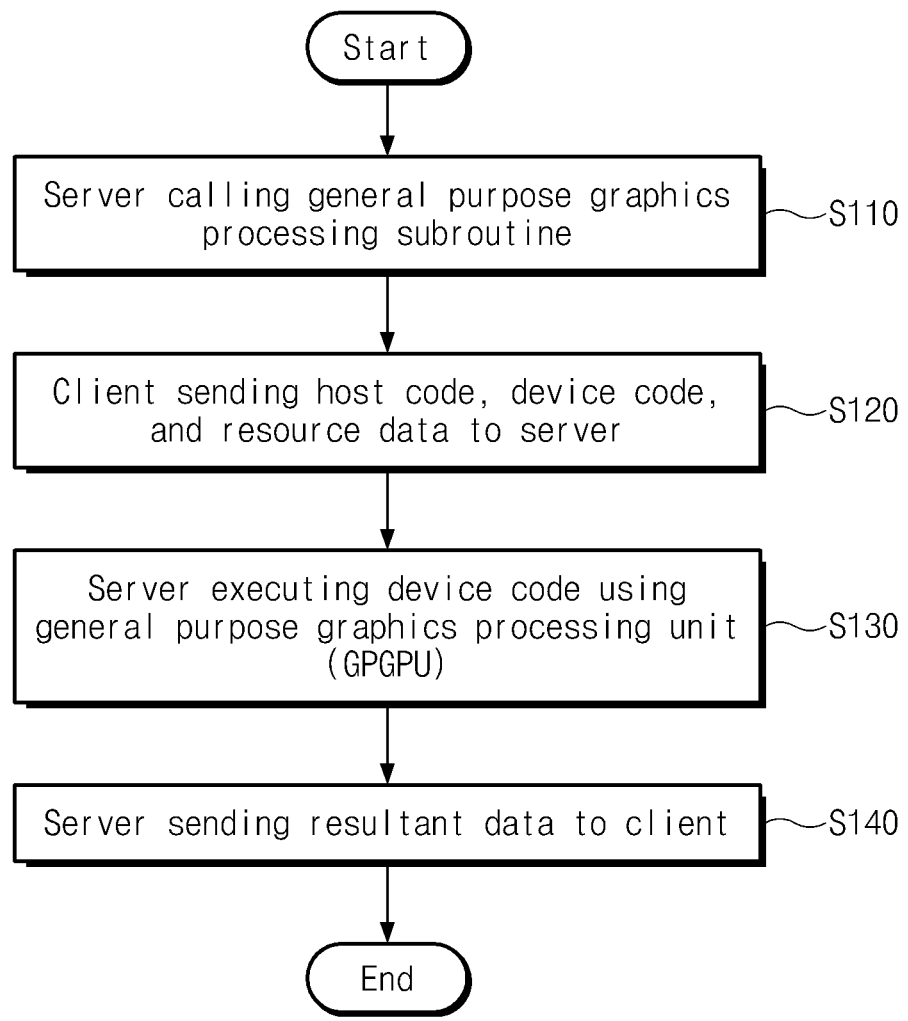

FIGS. 5 and 6 are flow charts illustrating a computing method according to an embodiment of the inventive concept.

Referring to FIG. 5, a computing method according to an embodiment of the inventive concept may include operations of calling a general purpose graphics processing subroutine (S110); sending a host code, a device code, and resource data to a server (S120); executing the device code using a GPGPU (S130); and sending resultant data to a client (S140). Herein, the operations S110 and S120 may be performed by the client, and the operations S130 and S140 may be performed by the server.

Referring to FIG. 6, a computing method according to an embodiment of the inventive concept may include operations of calling a general purpose graphics processing subroutine (S210); determining whether to send a target program execution request message to a server (S220); sending a host code, a device code, and resource data to the server (S230); executing the device code using a GPGPU (S240); sending resultant data to a client (S250); and executing a target program (S260). Herein, the operations S210, S220, S240, and S250 may be performed by the client, and the operations S230 and S260 may be performed by the server.

Returning to operation S220, if the client sends the target program execution request message to the server, the computing method according to an embodiment of the inventive concept may be performed including the operations S210, S220, S230, and S250.

Meanwhile, in operation S220, if the client does not send the target program execution request message to the server, the computing method according to an embodiment of the inventive concept may be performed including the operations S210, S220, and S260. That is, this case may correspond to the case that the client includes the GPGPU.

The computing method according to an embodiment of the inventive concept may be implemented by a program command form executable via various computing means so as to be recorded at computer readable medium. The computer readable medium may include magnetic medium (e.g., a hard disk drive, a floppy disk, a magnetic tape, etc.), optical medium (e.g., CD-ROM, DVD, etc.), magneto-optical medium (e.g., floptical medium, etc.), or a hardware device (e.g., ROM, RAM, flash memory, etc.) configured to store and perform a program command. The program command may include a machine language code written by a compiler, a high-level language code capable of being executed by a computer using an interpreter, and so on. The aforementioned hardware devices may be configured to operate as at least one or more software modules to perform an operation of the inventive concept, and vice versa.

As described above, in the case that a client 10 does not include a GPGPU 24, the computing method and system according to an embodiment of the inventive concept may communicate with a server 20 including the GPGPU 24 to execute a program using a GPGPU. Thus, it is possible to improve a program processing speed. Also, the whole computing speed of the client 10 may be improved. Also, the burden of the client 10 at execution of the program may be reduced.

The computing method and system according to an embodiment of the inventive concept may be used to process voice data. For example, analysis of voice data and data processing may be performed via a GPGPU of a server.

Also, the computing method and system according to an embodiment of the inventive concept may be used to process image data. For example, to improve a quality of a digital image and to add various effects to the digital image may be processed via the GPGPU of the server. Also, transcoding may be processed via the GPGPU of the server.

In addition, the computing method and system according to an embodiment of the inventive concept may be applied to virus scanning, encryption of a PC data storage device (e.g., a hard disk drive), and so on.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A computing method comprising:
   calling a general purpose graphics processing subroutine for execution of a target program by a client;
   determining whether the client includes a general purpose graphics processing unit (GPGPU) or not;
   sending a program execution request message for execution of the target program to a server if it is determined that the client does not include a GPGPU;
   sending a program code and resource data for execution of the target program corresponding to the request message to the server, if the program execution request message is not denied by the server; and
   executing the program code using a GPGPU by the server,
   wherein the client is connected with the server via a communications network comprising an Ethernet communications protocol or a wireless communications protocol,
   wherein the program code comprises a host code and a device code, the device code comprising a code for execution of the program,
   wherein the host code comprises a code for starting execution of the device code, the host code comprising a Java Bytecode,
   wherein the device code comprises a parallel thread execution (PTX) code, and
   wherein the resource data comprises a reference variable value, a required data file, and a subroutine parameter value.

2. The computing method of claim 1, further comprising: sending resultant data to the client by the server.

3. A computing system comprising:
   a client computer; and
   a server computer,
   wherein the client computer requests execution of a target program at the server computer,
   the server computer receives a request on execution of the target program from the client computer to execute the target program using a general purpose graphics processing unit (GPGPU) and transfers resultant data to the client computer,
   the server computer receives a program code and resource data for execution of the target program from the client computer,
   the client computer is connected with the server computer via a communications network comprising an Ethernet communications protocol or a wireless communications protocol,
   the program code comprises a host code and a device code, the device code comprising a code for execution of the program,
   the host code comprises a code for starting execution of the device code, the host code comprising a Java Bytecode,
   the device code comprises a parallel thread execution (PTX) code,
   the resource data comprises a reference variable value, a required data file, and a subroutine parameter value,
   the client computer comprises a determining unit that is configured to determine whether the client computer includes a GPGPU or not, and
   the client computer sends a program execution request message for execution of the target program to the server computer if it is determined that the client computer does not include the GPGPU.

4. A computing system comprising:
a client computer; and
a server computer,
wherein the client computer requests execution on at least one of a plurality of computing operations associated with general purpose graphics processing at the server computer and directly executes the remaining computing operations of the plurality of computing operations other than the at least one computing operation;
the server computer executes the at least one computing operation requested from the client computer using a general purpose graphics processing unit (GPGPU) and sends resultant data to the client computer,
the client computer sends a program code and resource data for execution of the at least one computing operation to the server computer,
the client computer is connected with the server computer via a communications network comprising an Ethernet communications protocol or a wireless communications protocol,
the program code comprises a host code and a device code, the device code comprising a code for execution of the program,
the host code comprises a code for starting execution of the device code, the host code comprising a Java Bytecode,
the device code comprises a parallel thread execution (PTX) code,
the resource data comprises a reference variable value, a required data file, and a subroutine parameter value,
the client computer comprises a determining unit that is configured to determine whether the client computer includes a GPGPU or not, and
the client computer sends a program execution request message for execution of the at least one computing operation to the server computer if it is determined that the client computer does not include the GPGPU.

5. An electronic device configured to request execution on at least one first computing operation of a plurality of computing operations associated with general purpose graphics processing at a server and to directly execute at least one second computing operation,
wherein the electronic device is connected with the server via a communications network comprising an Ethernet communications protocol or a wireless communications protocol,
the electronic device sends a program code and resource data for execution of the at least one first computing operation to the server via the communications network,
the program code comprises a host code and a device code, the device code comprising a code for execution of the program,
the host code comprises a code for starting execution of the device code, the host code comprising a Java Bytecode,
the device code comprises a parallel thread execution (PTX) code, and
the resource data comprises a reference variable value, a required data file, and a subroutine parameter value,
the electronic device comprises a determining unit that is configured to determine whether the electronic device includes a general purpose graphics processing unit (GPGPU) or not, and
the electronic device sends a program execution request message for execution of the at least one first computing operation to the server if it is determined that the electronic device does not include the GPGPU.

6. An electronic device configured to request execution of a general purpose graphics processing program at a server, to send a program code and resource data needed to execute the general purpose graphics processing program to the server, and to display a result of the general purpose graphics processing program executed by the server,
wherein the electronic device is connected with the server via a communications network comprising an Ethernet communications protocol or a wireless communications protocol,
the electronic device sends the program code and the resource data to the server via the communications network,
the program code comprises a host code and a device code, the device code comprising a code for execution of the general purpose graphics processing program,
the host code comprises a code for starting execution of the device code, the host code comprising a Java Bytecode,
the device code comprises a parallel thread execution (PTX) code, and
the resource data comprises a reference variable value, a required data file, and a subroutine parameter value,
the electronic device comprises a determining unit that is configured to determine whether the electronic device includes a general purpose graphics processing unit (GPGPU) or not, and
the electronic device sends a program execution request message for execution of the general purpose graphics processing program to the server if it is determined that the electronic device does not include the GPGPU.

7. A non-transitory computer readable storage medium configured to record a program to execute the method of claim 1.

* * * * *